United States Patent Office 3,318,779
Patented May 9, 1967

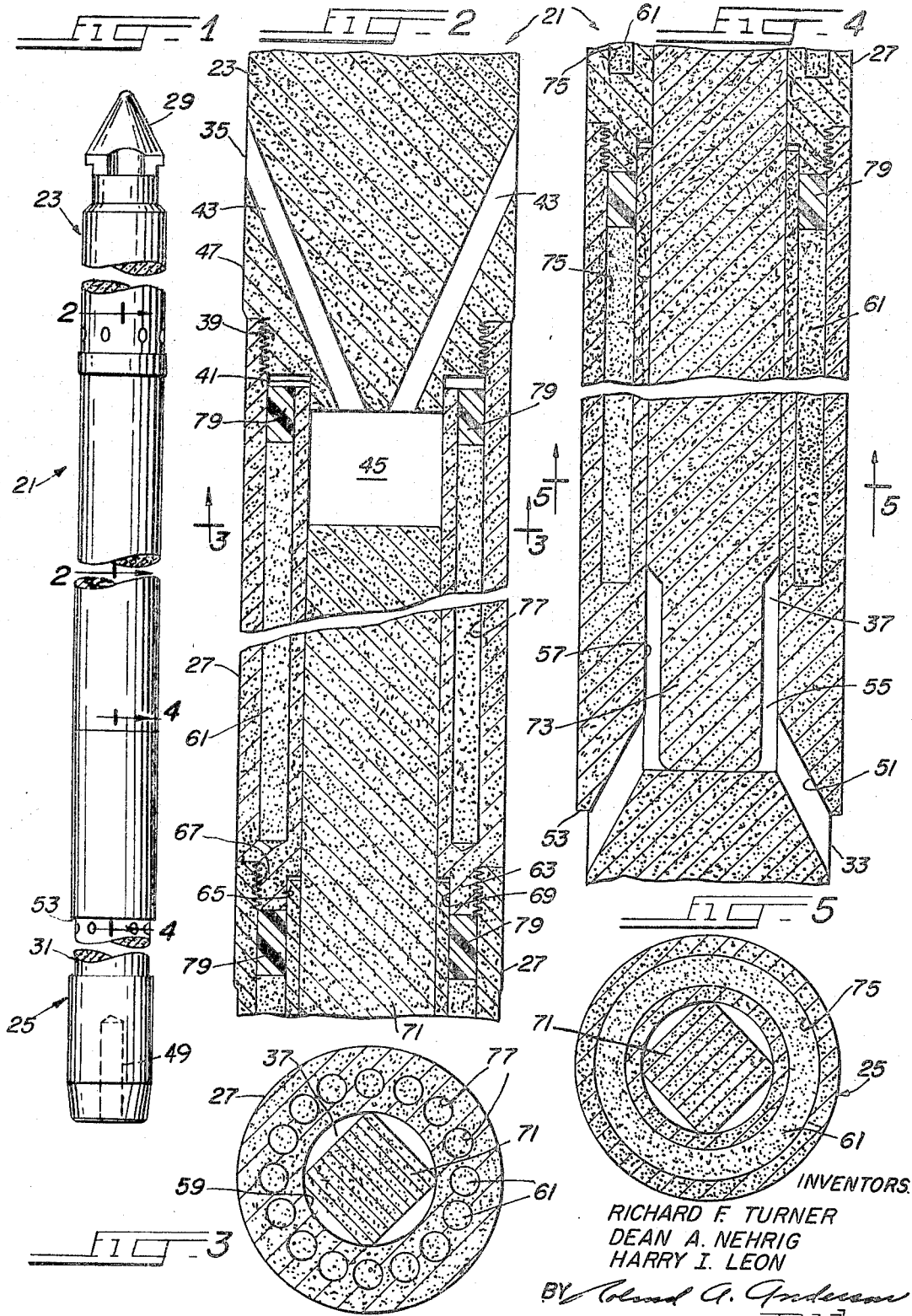

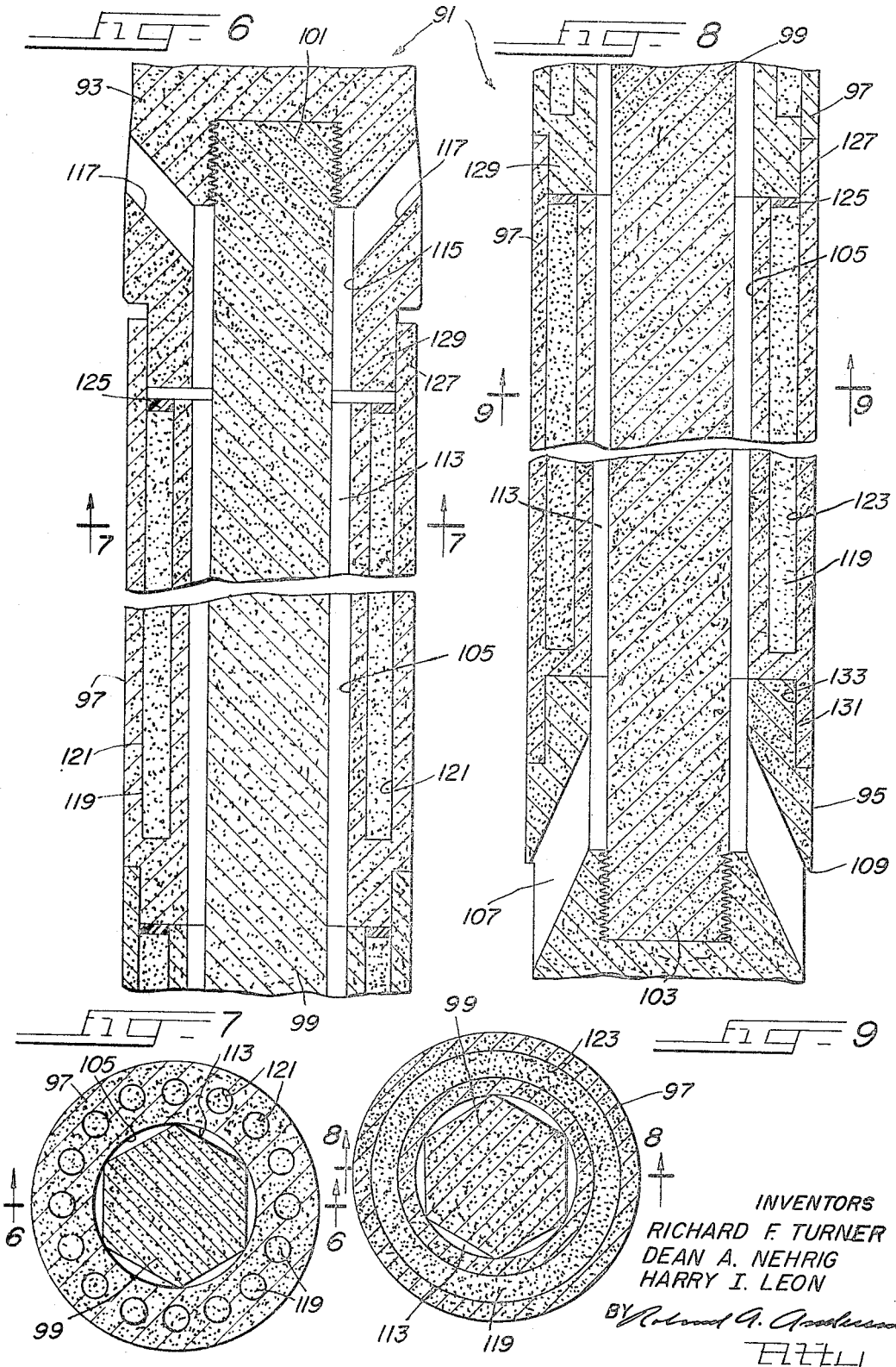

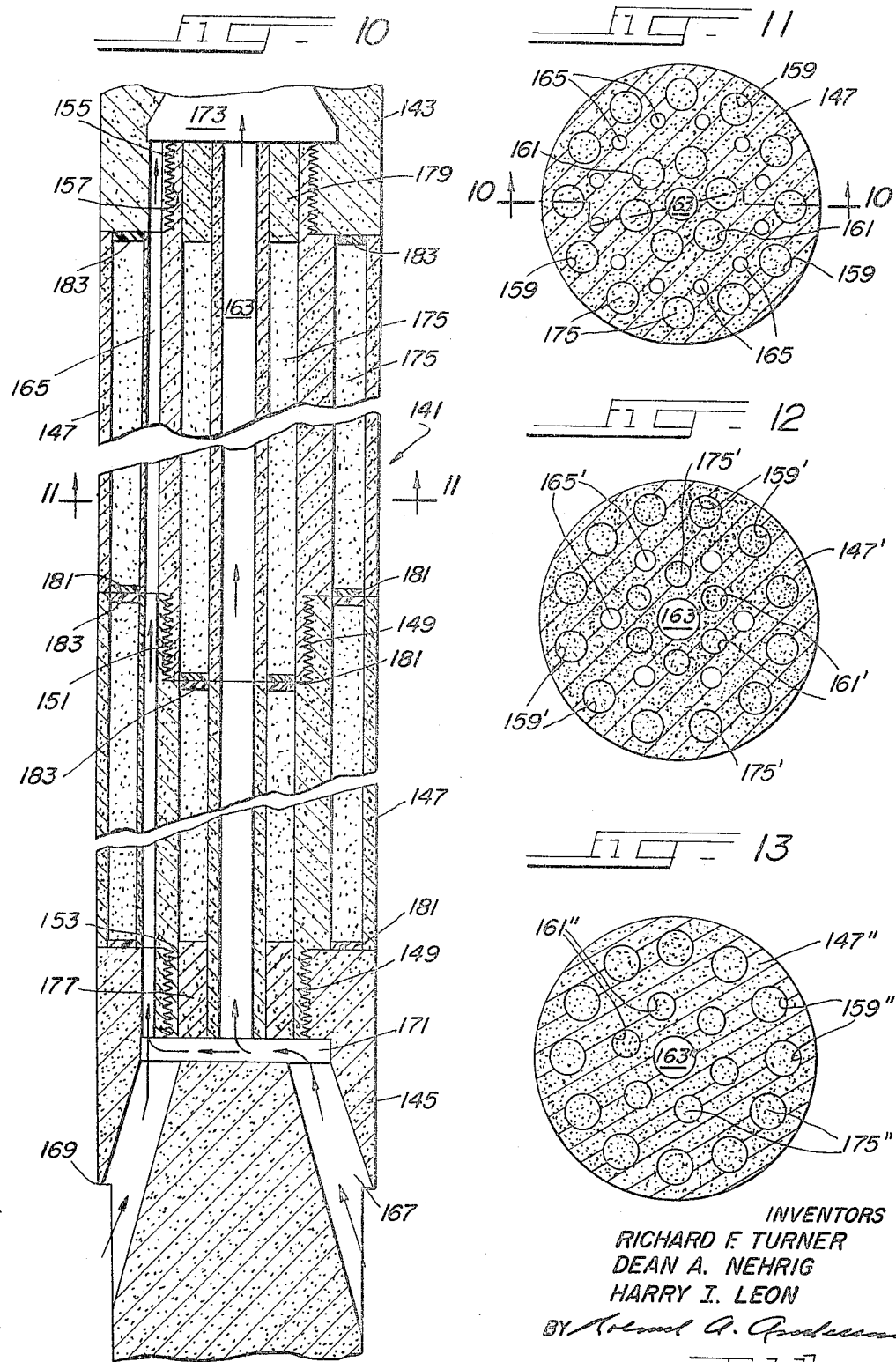

3,318,779
FUEL ELEMENT
Richard F. Turner and Dean A. Nehrig, San Diego, and Harry I. Leon, Del Mar, Calif., assignors, by mesne assignments, to the United States of America as represented by the United States Atomic Energy Commission
Filed June 9, 1965, Ser. No. 462,767
7 Claims. (Cl. 176—71)

ABSTRACT OF THE DISCLOSURE

Fuel elements for use in high temperature gas-cooled nuclear reactors in which a plurality of separate longitudinal refractory material body sections containing packed beds of nuclear fuel particles are utilized. These separate longitudinal body sections are interconnected by a spine around which, internal to the body sections, flow a coolant.

This invention relates to fuel elements for nuclear reactors and more particularly to fuel elements especially suited for use in high temperature gas-cooled nuclear reactors.

In reactors which operate at high power levels and which utilize a fluid coolant stream to extract heat from the fuel elements positioned in a reactor core, it is important to obtain efficient heat transfer from the nuclear fuel material in the fuel elements to the coolant stream. Accordingly, it is important that fuel element design be such that efficient heat transfer from the nuclear fuel material to the coolant stream is effected.

In reactors of this general type, which are often designed for the generation of useful power, it is important that the operating costs of the reactor system be generally competitive with other competing ways for the generation of useful power. A significant factor in power cost is the expense of fuel element fabrication. Therefore, fuel elements should be designed not only to effect efficient heat transfer between the nuclear fuel material and the fluid coolant stream but also to be capable of relatively inexpensive fabrication.

It is a principal object of the present invention to provide an improved fuel element for use in a nuclear reactor. It is a more particular object to provide a fuel element which exhibits good heat transfer from nuclear fuel material to fluid coolant stream and yet is capable of being economically fabricated. It is another object of the invention to provide a fuel element especially suited for a high temperature gas-cooled reactor which fuel element is simple in construction and has good structural stability under operating conditions. Still another object is to provide an elongated fuel element which can be inexpensively manufactured and which is especially suited for use in an axially flowing coolant stream. These and other objects of the invention are more particularly set forth in the following detailed description and in the accompanying drawings wherein:

FIGURE 1 is an elevational view of a fuel element embodying various of the features of the invention;

FIGURE 2 is an enlarged fragmentary sectional view of the fuel element shown in FIG. 1 taken generally along line 2—2 of FIG. 1;

FIGURE 3 is a sectional view taken along line 3—3 of FIGURE 2;

FIGURE 4 is an enlarged fragmentary sectional view taken generally along line 4—4 of FIG. 1;

FIGURE 5 is a sectional view taken along line 5—5 of FIG. 4;

FIGURE 6 is a view, similar to FIG. 2, of an alternate embodiment of a fuel element, and taken along line 6—6 at FIG. 7;

FIGURE 7 is a sectional view taken along line 7—7 of FIG. 6;

FIGURE 8 is a view similar to FIG. 4, illustrating the lower portion of the fuel element shown in FIG. 6, and taken along line 8—8 of FIG. 9;

FIGURE 9 is a sectional view taken along line 9—9 of FIG. 8;

FIGURE 10 is a fragmentary vertical sectional view of another alternate embodiment of a fuel element similar to that shown in FIG. 1, and taken along line 10—10 of FIG. 11;

FIGURE 11 is a sectional view taken along line 11—11 of FIG. 10;

FIGURE 12 is a sectional view similar to FIG. 11 of a modified embodiment of the fuel element shown in FIGS. 10 and 11; and FIGURE 13 is a sectional view similar to FIGS. 11 and 12 of a still further modified embodiment of the fuel element shown in FIGS. 10 and 11.

It has been found that a fuel element having good operating characteristics may be economically constructed by utilizing a packed bed of coated nuclear fuel particles disposed in fuel chambers provided in bodies of refractory material. By relying upon the coatings on the individual nuclear fuel particles to contain the fission product gases, the individual fuel elements and the nuclear reactor system may be constructed without the inclusion of a fission-product purging system. By utilizing a packed bed of such nuclear fuel material, the need for precise machining to dimensionally match fuel chambers and the nuclear fuel is reduced.

Moreover, it has been found that elongated fuel elements of this design can be simply and economically constructed of a plurality of separate longitudinal body sections which can be easily interconnected to form a composite fuel element having excellent structural stability at high temperature operating conditions. Construction in this manner affords the advantage of the utilization of elongated fuel elements while avoiding the cost inherent in machining long integral lengths of refractory materials. In addition, the utilization of separate longitudinal body sections permits easy variation in the fuel loading of longitudinal body sections and thereby provides a simple manner for realizing the various advantages which result from the employment of elongated fuel elements having varying nuclear fuel loadings in longitudinal zones thereof.

Illustrated in FIGURES 1 through 5 is a fuel element 21 for a nuclear reactor which is elongated in shape and which is designed to be disposed in the core of a nuclear reactor in an axially vertical position. The illustrated fuel element 21 is designed for use in a reactor employing a fluid coolant stream wherein the direction of coolant flow is longitudinally upward from the bottom of the fuel element to the top. However, it should be understood that the general features of the fuel element 21 are likewise suitable for inclusion in fuel elements designed for operation in reactors employing different coolant systems.

The specifically illustrated fuel element 21 is particularly designed for use in a high temperature gas-cooled nuclear reactor designed to operate at relatively high power densities. Although the fuel element 21 may hereinafter be described with reference to such a gas-cooled reactor, it should be understood that various features of the fuel element are equally applicable to reactors employing liquid coolant streams.

Generally, the fuel element comprises a top reflector 23, a bottom reflector 25 and a purality of intermediate elongated fuel element body sections 27. The top reflector 23 and the bottom reflector 25 both serve as a portion of the overall reflector of the nuclear reactor and, therefore, are made of a suitable structurally strong refractory material which has a low neutron-absorption cross section and a high scattering cross section, such as graphite. The particular shapes of the top and bottom reflectors are generally dictated by the reactor in which they are to be employed. The illustrated fuel element 21 is designed for use with a fuel handling grappling device for positioning the fuel elements within a nuclear reactor pressure vessel which device grasps the fuel element 21 at locations both on the top reflector 23 and on the bottom reflector 25. The top reflector 23 is provided with a grappling head 29 and the bottom reflector 25 is provided with necked-down portion 31 to which the grappling device attaches.

The fuel element 21 is both internally and externally cooled by the fluid coolant stream that flows axially upward past the fuel elements when they are positioned in the operating nuclear reactor core. Accordingly, the fuel element 21 is provided with coolant inlet means 33 in the bottom reflector 25, coolant outlet means 35 in the top reflector 23 and coolant passageway means 37 extending therebetween throughout the intermediate body sections 27.

The top reflector 23, which can be machined from a cylindrical piece of reactor grade graphite, has a stepped lower end including a middle threaded portion 39 carrying external threads and a terminal smooth wall portion 41 of circular cross section of a lesser diameter than the intermediate threaded portion 39. The coolant outlet means 35 includes six holes 43 drilled obliquely inward and downward from the outer surface of the top reflector 23. A cylindrical upper plenum chamber 45 is provided below the lower ends of these holes 43.

To assure preservation of the desired spacing between adjacent fuel elements 21 in the reactor core, the top reflector 23 may be provided with a spacing ring portion 47 that will assure the correct spacing between adjacent fuel elements. If desired, additional spacing rings (not shown) may be provided at predetermined vertical locations upon the intermediate body sections 27. The spacing ring portion 47 may be provided by machining the top reflector 23 from a piece of graphite having the desired diameter for the spacing ring. Alternately, the spacing ring 47 may be provided by building up an enlarged region by applying green graphite and baking, or by any other suitable method.

The bottom reflector 25, which supports the weight of the fuel element 21 and rests upon a lower grid plate in the reactor core, provides the relative spatial positioning of the fuel element in the reactor core. For this purpose, the bottom reflector 25 is provided at its lower end with an internal cavity 49 which is proportioned to receive a pin (not shown) which extends upward from the lower grid plate. The coolant inlet means 33 includes six inlet holes 51, circumferentially spaced about the outer surface of the bottom reflector 25, which holes extend obliquely inward and upward from the outer surface, the necked-down portion 31 of the bottom reflector 25 provides a shoulder 53, and the holes 51 begin from the outer surface immediately below this shoulder 53. This location of the holes 51 below the shoulder 53 induces a good flow of coolant from the axially flowing coolant stream upward into the fuel element 21. At their upper ends, the coolant inlet holes 51 empty into a lower plenum chamber 55 defined partially by the inner surface of a central bore 57 which is provided in the bottom reflector 25.

Each of the intermediate fuel element body sections 27 has the general shape of a sleeve of circular cross section having a concentric internal bore 59 which extends completely therethrough. Each of the body sections 27 contains a fuel chamber in which nuclear fuel material 61 is disposed, preferably in the form of a packed bed of coated nuclear fuel particles. Each of the intermediate body sections 27 comprises a separate fueled zone because, in the illustrated embodiment, there is no intercommunication between the fuel chambers in adjacent body sections.

In the illustrated fuel element 21, there are five separate intermediate body sections 27 of substantially the same length. However, the fuel element 21 includes six longitudinally spaced fueled zones. In the illustrated embodiment, instead of providing an additional intermediate body section 27, the bottom reflector 25 is formed to integrally include a fuel chamber at its upper end. Obviously, the lowermost fueled zone may be made separable from the bottom reflector 25 if desired.

Each of the intermediate fuel element body sections 27 is made of a suitable refractory material which is structurally strong at high temperature and high level irradiation and which has a low neutron-absorption cross section. Preferably, the body sections 27 are made of graphite, which additionally has good neutron moderating characteristics and therefore contributes a portion of the total moderator in the nuclear reactor core. The intermediate body sections 27 are screwed together, end to end, so that they are axially aligned and constitute the structural support of the fuel element 21 between the bottom reflector 25 and the top reflector 23.

To provide for the interconnection of adjacent body sections 27, each of the sections is provided at its lower end with an externally threaded end portion 63 of lesser diameter than the overall outer diameter of the body section. To assure that the connections between mating sections have good alignment and stability, a second mating surface 65 is provided, generally parallel to the threaded surface 63. The lower end of the central bore 59 of each of the body sections 27 is counterbored to provide a cylindrical, smooth wall mating surface 65 of slightly greater diameter than the inner diameter of the central bore.

The upper end of each of the intermediate body sections 27 is machined to interfit with the lower section of the adjacent section. In this respect, an annular space is cut out of the upper portion of the body sections 27, extending downward from the upper horizontal surface thereof. This annular space is proportioned to receive the threaded end 63 of the adjacent upper body section 27. In this respect, the annular space is provided with an internally threaded outer cylindrical wall 67 and a smooth-surfaced inner wall 69. When the adjacent body sections 27 are screwed together, the threaded end 63 interengages the internally threaded wall 67 to provide a tight threaded joint. In addition, the joint may be suitably cemented, if desired. At the same time, the smooth wall 69 forms a slip joint with the surface 65 of the counterbore. As can be seen in FIGURE 5, the upper portion of the bottom reflector 25, which serves as a fueled zone, has its upper portion formed with the same shape as the upper portion of one of the body sections 27.

Disposed in the aligned central bores 59 of the screwed-together intermediate body sections 27 is a central spine 71 of moderator material, such as graphite, which provides a substantial portion of the moderator of the individual fuel elements 21. The spine 71 is shaped to direct the upward flow of the coolant gas adjacent the inner cylindrical surface of the central bore 59 whereat the coolant picks up the heat generated in the nuclear fuel material 61. To properly and evenly direct the flow of coolant adjacent the entire inner cylindrical wall of the bore 59, the spine 71 is formed with a general cross sectional shape of a regular polygon. In the illustrated fuel element 21, as best seen in FIGURES 3 and 5, the spine 71 has the cross sectional shape of a regular square with rounded corners. The use of a spine 71 having a regular polygonal cross sectional shape directs approximately an equal flow of upward travelling coolant gas within each sector, i.e., between a flat vertical surface of the spine and the inner wall of the central bore 59. Additionally, no centering means need be employed with the spine 71 for spaces of approximately equal volume are inherently provided between each flat surface of the spine and the adjacent wall of the bore 59. These spaces generally comprise the coolant passageway means 37 in which the coolant travels upward from the coolant inlet means 33 to the coolant outlet means 35. The choice of the number of sides of the polygon permits regulation of the total cross sectional area of the sectors and resultant regulation of the coolant flow rate.

In the illustrated fuel element 21, the spine 71 is not considered a structural member inasmuch as it supports no load other than its own weight. Accordingly, the spine 71 can be machined from a single piece of graphite or may be easily made up from a plurality of pieces. Furthermore, because the spine 71 is self-centering, no ancillary positioning means need be employed and the bottom of the spine 71 may be permitted to rest, by gravity, on the horizontal surface at the bottom of the central bore 57 in the bottom reflector 25. However, the bottom portion of the spine 71 is reduced in diameter to a neck portion 73 of generally circular cross section to define the lower plenum chamber 55 in the annular space between the outer surface of the neck 73 and the inner surface of the central bore 57. The plenum chamber 55 assures that the inlet coolant flow, from the plurality of holes 51, is at equal pressure as it enters each of the sectors of the coolant passageway means 37.

In the illustrated fuel element 21, a different fuel chamber configuration is employed in the various fueled zones. In this respect, the lowermost two fueled zones are provided with annular fuel chambers 75, best seen in FIGURE 5, and the upper four fuel zones are provided with fuel chambers 77 in the form of holes. As best seen in FIGURE 3, each of the upper four intermediate body sections 27 has a plurality of fuel holes 77 equally spaced apart which have centers that fall on a circle of predetermined diameter.

As previously stated, the design of the fuel element 21 to include a plurality of separate body sections 27 facilitates variation in nuclear fuel loading between different longitudinal sections of the fuel element. In this respect the fuel element 21, which is designed for use with an upwardly axially flowing coolant stream, has the heaviest fuel loading in the lowermost fueled zone. Inasmuch as an annular fuel chamber has a larger volume than a comparable set of holes, an annular chmber 75 is employed for the lower zones while the plurlity of fuel holes 77 are employed for the upper fuel zones. This arrangement facilitates varying the loading of the fueled zones although employing, if desired, a generally uniform type of nuclear fuel material 61 inasmuch as there is a difference in the respective volumes of the fuel chamber means contained in a specific fuel zone. In many instances, this arrangement is preferable to varying the density or the composition of the nuclear fuel matrial, and it also has certain economic advantages for fabrication.

The volume of the annular fuel chambers 75 is easily regulated by varying the thickness of the chamber. The volume of the fuel chamber means in an upper fueled zone is easily varied by varying the diameters of the fuel holes 77. Although the specific fuel element 21 illustrated includes an arrangement of four fueled zones comprising a plurality of holes disposed above two fuel zones in the form of annular fuel chambers, it should be fully understood that other combinations may be used as desired, or, if desired, a single fuel element may employ all fuel zones of the same shape, as for instance all annular fuel chambers 75.

As previously stated, the nuclear fuel material 61 is preferably in the form of a packed bed of coated nuclear fuel particles. Coated fuel particles of any suitable size may be employed, preferably however, fuel particles having diameters (including the coating) in the range of about 250 microns to about 1000 microns are employed. The nuclear fuel material may be suitable fissile and/or fertile material, viz. uranium, plutonium, or thorium. The coatings should be suitable to maintain their integrity during expected fuel element life, usually a period of several years, and to excellently retain the gaseous fission products therewithin. The coatings should be such that the release of fission product gases should not exceed about $10^{-5}$ of the total amount of rare gases generated over the fuel element lifetime.

Any suitable coatings may be used which meet the above-stated criteria. Examples of suitable coating materials for fuel elements employing a graphite moderator system include, but are by no means limited to, pyrolytic carbon and silicon carbide. An example of one type of coated fuel particle considered suitable is a particle having a nuclear fuel seed center of a mixture of uranium dicarbide and thorium dicarbide, an inner coating of spongy pyrolytic carbon about 5 to 50 microns thick, an intermediate coating of dense, thermally conductive, laminar pyrolytic carbon between about 10 and 80 microns thick, and a distinct and discontinuous outer coating of dense, thermally conductive, columnar pyrolytic carbon about 10 to 80 microns thick.

In fabrication of the fuel element 21, each of the intermediate fuel element body sections 27 is machined and separately filled with nuclear fuel 61. They are then assembled to make up the composite fuel element. The desired quantity of nuclear fuel material 61 is filled into each fuel chamber, employing vibration compaction or other types of compaction, if desired, to achieve the desired filling. To assure that there is no loss of nuclear fuel material between filling and assembly, plugs 79 are inserted at the top of the nuclear fuel material 61. The plugs 79 fit flush with the top of the fuel chambers, occupying substantially all of the vacant space above the fuel material 61.

The plugs 79 are circular in shape for the fuel holes 77 and annular in shape to close the tops of the annular fuel chambers 75. The plugs 79 are preferably made of a heat-decomposable material, such as polystyrene, which will be substantially carbonized and vaporized as the fuel element 21 is brought up to reactor temperature. Accordingly, the decomposition of the plugs 79 provides vacant space at the top of each fuel chamber which can accommodate differential relative expansion or contraction between the intermediate body sections 27 and the nuclear fuel material 61. Thus, the plugs 79 serve a dual purpose: facilitating fabrication and assembly of the fuel element 21 and, because of their decomposable nature, providing vacant space to accommodate fuel expansion.

Because there is always the danger that mishandling of a fuel element might possibly occur during loading or unloading a nuclear reactor which could cause the fuel element to be structurally broken, it may be desirable to additionally treat the packed bed of nuclear fuel material 61 in the fuel element 21 to eliminate the possibility that the fuel particles might be released into the circulating gas stream and carried throughout the reactor circuit. If it is considered desirable to establish a safeguard within each of the fuel elements against such a mishap, rather than at some other location in the reactor, the fuel particles in the packed beds may be bonded to one another in a suitable manner. One suitable way of accomplishing bonding is by using coal tar pitch or some other carbonaceous resin which may be mixed with the nuclear fuel particles as they are filled into the fuel chambers. After the assembly of a body section 27 is complete, it may be simply heated to a high enough temperature to cause carbonization of the pitch to cause it thereafter to bond adjacent particles. Alternately, the individual coated fuel particles may be spray-coated with a suitable binder before filling the fuel chambers and subsequently the binder be heat-activated as above.

In addition to providing a simple, economical fuel element design, the invention also facilitates the provision of a fuel having a high degree of structural integrity by the minimization of temperature gradients in the graphite structural material and, accordingly, of graphite contraction gradients due to fast neutron damage. Analysis of graphite contraction data indicates that its effects can be reduced by reducing the mean temperature of the structural graphite body and by minimizing the temperature differences existing within the fueled graphite body while at operating conditions. The provision within the fuel element 21 of the plurality of separate longitudinal fuel zones facilitates the minimization of the temperature differences within the structural graphite by facilitating differential fuel loadings via the difference in fuel chamber volumes. Thus, even though the temperature of the upwardly moving coolant stream is increasing as it travels longitudinally along the fuel elements 21, a more uniform temperature distribution is accomplished throughout the structural graphite in the fuel elements.

An alternate embodiment of the fuel element shown in FIGURES 1 through 5 is illustrated in FIGURES 6 through 9. In these figures, a fuel element 91 is shown which is similar in many respects to the previously described fuel element 21. The fuel element 91 includes a top reflector 93 and a bottom reflector 95 which may be generally similar in shape to those previously described. Disposed between the top reflector 93 and the bottom reflector 95 are a plurality of intermediate fuel element body sections 97. The intermediate body sections 97 do not structurally aid in supporting the overall weight of the fuel element 91 as did the body sections 27 in the fuel element 21. Instead, in the fuel element 91, the structural member extending between the bottom reflector 95 and the top reflector 93 is a central spine 99. The same refractory materials having relatively good thermal conductivity as set forth with reference to the portions of fuel element 21, may be likewise used to manufacture the components of fuel element 91.

Inasmuch as the central spine 99 serves as a primary structural member, and preferably contributes substantially to the total moderator of the fuel element 91, it is made of a suitable material having both structural and moderating characteristics at the desired operating reactor conditions, such are graphite. The central spine 99 may be made of a single piece of graphite or may be made of a plurality of sections of graphite axially joined in any suitable manner, as by threaded connections.

As best seen in FIGURES 7 and 9, the central spine 99 has the cross sectional shape of a regular polygon, the embodiment shown being a regular hexagon with slightly rounded corners. As in the previously described fuel element, the intermediate body sections 97 have the general shape of sleeves which have an internal bore 105 concentric with the outer cylindrical surface thereof. The central spine 99 is proportioned with reference to the dimensions of the internal bores 105 so that the intermediate body sections 97 are self-centering about the central spine 99.

The central spine 99 has a threaded upper end portion 101 which screws into a suitable threaded hole provided in the underside of the top reflector 93. The spine 99 also has a threaded lower end portion 103 which screws into a similar threaded hole provided in the bottom reflector 95. The length of the spine 99 is proportioned to provide a gap between the top surfaces of the uppermost intermediate body section 97 and the facing surfaces of the top reflector 93 to allow for differential expansion or contraction.

The coolant flow pattern internally through the fuel element 91 is generally similar to that through the fuel element 21. The upwardly flowing fluid coolant enters the fuel element 91 through a plurality of obliquely upward extending coolant inlet holes 107 which are positioned at a point of entry in the outer surface of the bottom reflector 95 just below a shoulder 109. The inlet coolant holes 107 extend upward into a central bore 111 provided in the bottom reflector 95. The six sector-like spaces between the vertical walls of the spine 99 and the internal cylindrical wall of the bore 105 provide coolant passageway means 113 upward past the fueled zones of the fuel element 91. Near the top, the upward flowing coolant enters an internal bore 115 in the top reflector 93, having a diameter slightly larger than the internal bores 105, and exits therefrom through a plurality of coolant outlet holes 117 which extend obliquely outward through the top reflector to the outer surface thereof.

The nuclear fuel loading arrangement illustrated in fuel element 91 is generally similar to that described with respect to fuel element 21. Fuel element 91 comprises six separate longitudinal fueled zones, each of which is disposed in a separate intermediate body section 97, of which there are six in number. Nuclear fuel material 119, preferably in the form of packed beds of coated nuclear fuel particles, is disposed in the four upper fueled zones in fuel chamber means in the form of a plurality of fuel holes 121, as best seen in FIGURE 7. In the two lower body sections 97, annular fuel chambers 123 are provided similar to those previously described. Plugs 125, such as graphite, are employed to close the upper open ends of each of the fuel chambers. The plugs are coated with a thin coating of coal tar pitch, or other carbonaceous resin, and placed in the open ends of the fuel chambers. The coal tar pitch, or some other carbonaceous resin, which is carbonized as the fuel element is brought to operating temperatures, serves to cement the plugs to the fuel chamber walls.

In the fuel element 91, the intermediate body sections 97 are axially slideable relative to the central spine 99. This arrangement facilitates relative movement between these components which may result from differential expansion or contraction occurring during reactor operation. In the illustrated embodiment, the joint betwen adjacent intermediate body sections 97, and between the uppermost and lowermost body sections and the top reflector 93 and bottom reflector 95, respectively, are slip joints. As best seen in FIGURES 6 and 8, the intermediate body sections 97 are formed with tubular collars 127 at their upper ends. The top reflector 93 and the upper five intermediate body sections 97 are provided with neck portions 129 at their lower ends. The tubular collars 127 and the neck portions 129 are proportioned so that the outer cylindrical surface of the neck portions are slideably received within and adjacent the inner surfaces of the tubular collars 127. The lowermost body section 97 is provided with a depending collar 131 which slideably receives an upper neck portion 133 formed on the bottom reflector 95.

Various modifications in the design of the interconnections between adjacent intermediate body sections 97 may be employed. For example, it may be desirable to structurally interconnect adjacent body sections 97. To achieve this end, the tubular collars 127 and the neck portions 129 may be provided with interengaging threads. With such an arrangement, it may also be desirable to vertically hang the intermediate body sections 97 from one another, rather than support them upon the lowermost body section. In this case the tubular collar 127 of the uppermost body section 97 may be threadably connected to the top reflector 93; correspondingly, the joint between the depending collar 131 and the reflector 133 may remain a slip joint with a gap, for accommodating differential contraction and/or expansion, being located between the lowermost body section 97 and the facing surfaces of the bottom reflector 95.

It can be seen various of the advantages previously set forth with respect to the specific construction of fuel element 21 are likewise similarly apparent in the construction of fuel element 91.

Another alternate embodiment of a fuel element having various features of the invention is illustrated in FIGURES 10 and 11, wherein fuel element 141 is shown which includes a top reflector 143, a bottom reflector 145 and a plurality of axially aligned intermediate fuel element body sections 147. The top reflector 143 and the bottom reflector 145 may be made of similar material and may be made with the similar external shape as the top reflector and bottom reflector previously described for fuel element 21.

Each of the intermediate body sections 147 has the general shape of a solid cylinder or rod of refractory materials of relatively good thermal conductivity having a plurality of parallel holes extending longitudinally therethrough. In the illustrated embodiment, the body sections 147 are respectively threadably interconnected to one another, to the top reflector 143 and to the bottom reflector 145 so that each of the body sections is a structural member of the reactor fuel element 141.

As best seen in FIGURE 10, each of the intermediate body sections 147 is formed with a depending threaded end piece 149. Correspondingly, a mating threaded hole 151 is provided in the upper portion of each of the body sections 147, with the exception of the uppermost section. The bottom reflector 145 is provided with a similarly shaped threaded hole 153, whereby the bottom reflector is joined to the lowermost body section 147. The uppermost body section 147 is provided with a threaded upper end 155 generally similar to the threaded lower end pieces 149. The upper end 155 screws into a mating threaded hole 157 provided in the lower portion of the top reflector 143. The fuel element 141 includes six separate intermediate body sections 147, each of which provides a separate longitudinal fueled zone between the top reflector 143 and the bottom reflector 145.

The longitudinal holes which extend through the intermediate body sections 147 serve either as fuel chambers or coolant passageways. As best seen in FIGURE 11, the fuel element 141 includes an outer ring of twelve fuel chambers 159 of circular cross section and an inner ring of six fuel chambers 161 having diameters slightly less than the fuel chambers 159. In addition, each of the body sections 147 includes a central coolant hole 163 and a plurality of coolant holes 165 of smaller diameter arranged in a ring in a location generally between the ring of outer fuel chambers 159 and the ring of inner fuel chambers 161. The number of fuel chambers in the inner and outer rings of fuel chambers may be more or less than that shown in FIGURE 11.

In the assembled fuel element 141, the intermediate body sections 147 are positioned so that the respective coolant holes 165 (and accordingly the respective fuel chambers 159 and 161) are aligned axially so that the coolant holes 165 provides continuous passageways for fluid coolant from the bottom reflector 145 to the top reflector 143. A plurality of coolant inlet holes 167 are provided in the bottom reflector 145, which holes enter the outer surface at a location generally below a shoulder 169 and extend obliquely upward and inward. At their upper ends, the holes 167 emerge into a lower plenum chamber 171, which is cut out of the bottom reflector 145 at a location generally just below the bottom of the threaded hole 153.

The central coolant hole 163 and all of the coolant holes 165 are in fluid communication at their lower ends with the plenum chamber 171 so that the inwardly flowing coolant travels upwardly therethrough as generally shown by the arrows in FIGURE 10. An upper plenum chamber 173 is provided in the top reflector 143. The top reflector 143 is constructed with the necessary passageways to link plenum chamber 173 in fluid communication with the upper ends of the central coolant hole 163 and all of the coolant holes 165. Outlet passageways (not shown) may be provided in the top reflector 143 which extend obliquely outward from the plenum chamber 173, as in the fuel element 21, or a vertical outlet passageway may be provided extending directly outward through the top of the top reflector.

The intermediate body sections 147 shown in FIGURES 10 and 11 are depicted as they would appear when fabricated from extruded sections of refractory material. As can be seen, the multi-holed body sections are particularly adaptable to manufacture by extrusion. No further machining is required to prepare the coolant holes 163 and 165 before assembly as a fuel element 141. Moreover, by the use of nuclear fuel material 175 in the fuel chambers in the form of packed beds of discrete coated particles, as hereinbefore described, the tolerances which can be achieved in extrusion become acceptable for final form. Therefore, further machining of the fuel chambers 159 and 161 is not required.

Because, in such an extruded shape as that illustrated, the fuel chamber holes run completely through each of the intermediate body sections 147, it is necessary to plug certain ends of these holes to preliminarily create the desired fuel chambers 159 and 161. As best seen in FIGURE 10, the lower ends of the inner fuel chambers 161 of the lower body section are closed with long cylindrical plugs 177 made of a suitable refractory material, such as the same material from which the body sections 147 fabricated. The long plugs 177 bring the lower levels of the fuel chambers 161 to the same vertical level as the outer fuel chambers 159. The plugs 177 are threaded and/or cemented in place using a suitable cement, such as coal tar pitch.

Generally similar long plugs 179 are provided at the upper ends of the inner fuel chambers 161 of the top body section 147 to separate the tops of these fuel chambers from the upper plenum chamber 173. Short plugs 181, made of a similar material and installed in a similar fashion, are employed at the lower ends of all of the outer fuel chambers 159 and at the lower ends of the inner fuel chambers 161 in the five upper intermediate body sections 147.

Plugs 183 are installed at the upper ends of all of the outer fuel chambers 159 and the upper ends of the inner fuel chambers 161 in the five lower body sections 147. If desired, these plugs 183 may be made of a heat-decomposable material for the advantages hereinbefore explained. If, for a particular application, it is desired to have continuous fuel chambers extending throughout, longitudinally, the entire fueled length of the fuel element, the plugs 181 may also be made of heat-decomposable material.

The relative distribution pattern of fuel chambers 159 and 161, in the fuel element 141, to coolant holes 163 and 165 is considered suitable for operation for extended periods in high temperature gas-cooled nuclear reactors. The distribution of internal flowing coolant throughout the interior of the fuel element 141 provides effective heat transfer from the nuclear fuel material 175 within the fuel chambers to the internal coolant stream moving through the coolant holes 163 and 165.

In one physical embodiment of a fuel element 141 which is considered suitable for extended reactor operation, graphite body sections 147 are employed having an outer diameter of 4.65 inches. Fuel chambers 159 and 161 of diameters of 0.54 inch and 0.45 inch, respectively, are employed in the locations illustrated on FIGURE 11. The central coolant passageway 163 has a 0.6 inch diameter, and twelve coolant holes 165, each 0.25 inch in diameter, are used. Each fuel element 141 utilizes six intermediate body sections 147, each of which has a fueled length of about 31 inches. Nuclear fuel material 175 is employed in the form of discrete fuel particles made of mixtures of uranium carbide and thorium carbide with the atom ratio of thorium to uranium about 12 to 1. Coated particles about 500 microns in diameter are employed, each having a Triplex coating about 120 microns in thickness. The fuel element 141 having the above dimensions is considered to function satisfactorily in a high temperature gas-cooled reactor wherein helium is used as the fluid coolant.

A modified embodiment of the fuel element 141 is shown in cross sectional view in FIGURE 12. An intermediate body section 147' is illustrated which includes twelve outer fuel chambers 159' and six inner fuel chambers 161'. The centers of the fuel chambers 159' and 161' lie on two concentric circles. The centers of six coolant holes 165' lie on a similarly concentric circle. A center coolant hole 163' of larger diameter completes the multi-hole arrangement in the fuel element body section 147'. The fuel chambers 159' and 161' are preferably filled with packed beds of coated particles of nuclear fuel material 175'. A fuel element made using this arrangement is considered generally comparable to the fuel element 141 shown in FIGURES 10 and 11.

An example of one suitable physical arrangement utilizes a 4.65 inches diameter body section 147' having twelve outer fuel chambers 159', each 0.54 inch in diameter, and six inner fuel chambers 161', each 0.45 inch in diameter. The central coolant hole 163' has a diameter of 0.6 inch, and the six coolant holes 165' have diameters of about 0.35 inch. The remaining specifications are the same as those set forth above with reference to fuel element 141.

A second modification of the fuel element 141 is shown in FIGURE 13 wherein a cross sectional view through an intermediate fuel element body section 147'' is illustrated. The body section 147'' includes twelve outer fuel chambers 159'' and six inner fuel chambers 161'', the centers of which lie on two concentric circles. These fuel chambers are preferably filled with packed beds of coated particles of nuclear fuel material 175''. A single central coolant hole 163'' is employed.

In a physical construction of a suitable fuel element employing this configuration, a body section 147'' of 4.65 inches diameter is used having outer fuel chambers 159'' of a diameter of 0.54 inch, inner fuel chambers 161'' of a diameter of 0.45 inch, and a single central coolant hole 163'' about 0.8 inch in diameter. The remaining specifications of the fuel element are the same as those set forth with respect to fuel element 141. Whereas a fuel element employing intermediate fuel element body sections 147'' may utilize somewhat less internal cooling than the fuel elements employing body sections 147 or 147', such a fuel element is considered suitable for various high-temperature, gas-cooled nuclear reactors.

The following example is illustrative of a fuel element of the type shown in FIGURES 1 through 5 of the drawings. This example should be understood to in no way limit the scope of the invention which is defined in the appended claims.

EXAMPLE

A generally cylindrical fuel element 21 may be fabricated having an outer diameter of 4.67 inches. This fuel element is adapted for use in a high temperature reactor utilizing helium as a coolant, such as the HTGR. The HTGR (high temperature, graphite moderated, gas-cooled reactor) is described in detail in Nucleonics, volume 18, No. 1, pp. 86–90, January 1960. The top reflector 23 and the bottom reflector 25 are machined from cylindrical sections of reactor grade graphite having a density of about 1.8 grams/cc. The spacing ring portion 47 is dimensioned to have a diameter of about 4.70 inches. The top reflector 23 contains six coolant outlet holes 43, one-half inch in diameter and spaced 60° apart. The bottom reflector 25 contains six coolant inlet holes 51 of like size and spacing.

The five intermediate fuel element body sections 27 are made from sleeves of reactor grade graphite having a density of about 1.8 grams/cc. and having a wall thickness of 1.15 inches. The dimensions of the intermediate body sections 27 and the bottom reflector 25 are sufficient to provide six longitudinally spaced separate fueled zones, each of which has a vertical length of about 31 inches. The four upper intermediate body sections 27 each contain sixteen fuel holes 77, the centers of which lie on a circle which is concentric with the circular outer cross section of the body sections 27. The lowermost body section 27 and bottom reflector 25 contain fueled zones in the form of annular fuel chambers 75. The fuel holes 77 and the annular fuel chambers 75 are located so that there is a graphite wall thickness of about 0.4 inch from the outermost point in a fuel chamber to the outer surface of the body section 27.

In this fuel element, the fuel loading varies between the six separate longitudinal fueled zones. The variation in fuel loading is accomplished by varying the total fuel chamber volume in different zones. Because the fuel chamber means in all the zones are of substantially equal depth, the total cross sectional area of a fuel chamber means is indicative of its volume. In the fuel zone in the bottom reflector 25 an annular fuel chamber having a thickness of 0.478 inch and an outer diameter of about 3.87 is employed. In the next fuel zone thereabove, an annular fuel chamber with a thickness of 0.379 inch and an outer diameter of 3.87 is employed. In the next fuel chamber thereabove, sixteen fuel holes 77 of a diameter of 0.309 inch each are employed. In the next two fueled zones thereabove, sixteen fuel holes 77 having diameters of 0.263 inch are employed. In the uppermost fueled zone, sixteen fuel holes 77 having diameters of 0.224 inch are employed.

All of the fueled chambers are filled with packed beds of Triplex coated nuclear fuel particles. Particles in the form of coated spheroids of a diameter of about 500 microns apiece are employed. These fuel particles each comprise a nuclear fuel center in the form of a spheroidal particle of uranium carbide and/or thorium carbide about 260 microns in diameter. The atom ratio of thorium to uranium in the overall fuel mixture is about 12 to 1. The uranium is about 93 percent enriched. A first layer of spongy pyrolytic carbon about 20 microns in thickness completely surrounds the nuclear fuel center. An intermediate layer of dense laminar pyrolytic carbon about 50 microns in thickness surrounds the spongy carbon inner layer. A third layer of columnar pyrolytic carbon about 50 microns in thickness completely surrounds the intermediate laminar carbon layer. The nuclear fuel particles may be vibration compacted to form packed beds within all of the fuel chambers.

In this arrangement, the lowermost fuel zone contains about .23 kg. of uranium. The fuel zone thereabove contains about .15 kg. of uranium. The next fuel zone thereabove contains about .11 kg. of uranium. The next two fuel zones thereabove each contain about .09 kg. of uranium. The uppermost fuel zone zone contains about .085 kg. of uranium.

After the fuel chambers have been filled with the nuclear fuel material 61 to the desired levels, the tops of the chamber are closed by pressing thereinto plugs 79 of suitable dimensions made of polystyrene of a thickness of about 1 inch.

In the assembly of the fuel element, the central spine 71, which is machined from three pieces of reactor grade graphite having a density of about 1.8 grams/cc., which pieces are suitably interconnected to one another, is set into the central bore 57 of the bottom reflector 25. The general cross section of the spine 71 is that of a regular square having rounded corners. A tolerance between the outer dimension of the spine and the inner diameter of the central bore of about 0.01 inch is provided. About the lower 3.5 inches of the spine 71 are necked down to provide a bottom neck portion circular in cross section with a diameter of about 1.8 inches.

The threaded end section of the lowermost fuel element body section is coated with a thin coating of coal tar pitch, or some other carbonaceous resin, and then lowered over the spine 71 and screwed into contact with the mating threads of the internally threaded portion at the top of the bottom reflector 25. The coal tar pitch, or some other carbonaceous resin, which is carbonized as the fuel element is brought to operating temperature, serves to cement this threaded joint. One by one, the remainder of the body sections 27 are screwed together in the similar manner. To complete the assembly of the fuel element, the threaded portion 39 of the top reflector 23 is coated with a thin coating of coal tar pitch and screwed into tight contact with the uppermost body section 27.

A shorter version of the assembled fuel element is operated under simulated reactor conditions for substantial periods of time at full power operation. During this period, the fuel element is cycled so that it operates under full power with normal upward helium coolant flow, under shutdown conditions with by-pass coolant flow, and under cleanup conditions with no coolant flow. During all these modes of operation, the fission product activity from fission product gases escaping from the coated nuclear fuel particles remains at a very low level, well within limits considered satisfactory.

The simulated full power reactor operation of the coated fuel particles carried on at a fuel bed operating temperature of at least about 1400° C. over a sufficient cumulative period to accomplish burn-up of about 21 percent of the fissile uranium atoms. The differential nuclear fuel loading in the six separate longitudinal fueled zones is found to accomplish the desired minimization of temperature differences existing within the fuel graphite body. The fuel element performs satisfactorily throughout the entire operation and remains structurally strong at the conclusion thereof. Data collected throughout the tests shows that the fission product release rate of xenon isotopes from the coated nuclear fuel particles is less than about $1 \times 10^{-5}$ of the total xenon created. The release of the krypton isotopes is less than about $1 \times 10^{-5}$.

Examination of representative graphite samples of the fuel element irradiated to high fast neutron doses shows that the contraction of the graphite structure material as a result of subjection to irradiation is well below limits considered unacceptable. The fuel element is considered excellently suited for use within a high temperature gas-cooled nuclear reactor designed to operate at high gas-cooled nuclear reactor power densities.

Various of the features of the invention are set forth in the following claims.

What is claimed is:

1. A fuel element for a nuclear reactor utilizing a fluid coolant stream, which fuel element comprises a plurality of axially aligned interconnected elongated separate fuel element body sections in the form of sleeves having internal central bores which are axially aligned with one another, each of said elongated sleeves having formed therein longitudinally extending fuel chamber means, a spine of structurally strong refractory neutron moderating material comprising the primary longitudinal structural member of the fuel element axially disposed within said aligned central bores and slideable therein, said spine being proportioned to provide longitudinally extending passageway means for the fluid coolant in the space between the outer surface of said spine and the inner surface of said bores, and a bed of discrete nuclear fuel particles disposed within each fuel chamber means.

2. A fuel element for a nuclear reactor, which fuel element comprises a plurality of axially aligned interconnected elongated separate fuel element body sections, each of said elongated body sections having formed therein longitudinally extending fuel chamber means, said fuel chamber means in one body section being separate from said fuel chamber means in an adjacent body section to provide a plurality of separate longitudinal fuel zones, a bed of discrete nuclear fuel particles disposed within each fuel chamber means, each of said fuel particles being completely covered with a coating of impervious material which is capable of preventing passage therethrough of substantially all of the fission products produced in said nuclear fuel material throughout the expected life of the fuel element, the volumes of said fuel chamber means in one body section being different from the volume of said fuel chamber means in an adjacent body section whereby different nuclear fuel loadings in adjacent fuel zones is facilitated.

3. A fuel element for a nuclear reactor which fuel element comprises a plurality of axially aligned elongated separate fuel element body sections, each of said elongated body sections having formed therein longitudinally extending fuel chamber means, said fuel chamber means in one body section being separate from said fuel chamber means in an adjacent body section to provide a plurality of separate longitudinal fuel zones, at least one of said fuel chamber means being an annular chamber, a bed of discrete nuclear fuel particles disposed within each fuel chamber means, each of said fuel particles being completely covered with a coating of impervious material which is capable of preventing passage therethrough of substantially all of the fission products produced in said nuclear fuel material throughout the expected life of the fuel element, the volumes of said fuel chamber means in one body section being different from the volume of said fuel chamber means in an adjacent zone whereby different amounts of nuclear fuel loadings in adjacent fuel zones is facilitated.

4. A fuel element for a nuclear reactor utilizing a fluid coolant stream, which fuel element comprises a plurality of axially aligned elongated separate graphite fuel element body sections, each of said elongated body sections having formed therein longitudinally extending fuel chamber means and longitudinally extending coolant passageway means, said passageway means in one body section being in fluid communication with said passageway means in the adjacent body section, said fuel chamber means in one body section being separate from said fuel chamber means in an adjacent body section to provide a plurality of longitudinally spaced fuel zones, a bed of discrete nuclear fuel particles disposed within each fuel chamber, each of said fuel particles being completely covered with a coating of impervious material which is capable of preventing passage therethrough of substantially all of the fission products produced in said nuclear fuel material throughout the expected life of the fuel element, the volume of said fuel chamber means in one body section being different from the volume of said fuel chamber means in an adjacent zone whereby different amounts of nuclear fuel loadings in adjacent fuel zones is facilitated.

5. A fuel element for a nuclear reactor utilizing a fluid coolant stream, which fuel element comprises a plurality of axially aligned elongated separate fuel element body sections in the form of sleeves having internal central bores which are axially aligned with one another, each of said elongated sleeves having formed therein longitudinally extending fuel chamber means, said fuel chamber means in one body section being separate from said fuel chamber means in an adjacent body section to provide a plurality of separate longitudinal fuel zones, a spine of neutron moderating material disposed within said aligned central bores, said spine being proportioned to provide longitudinally extending passageway means for the fluid coolant in the space between the outer surface of said spine and the inner surface of said bores, and a bed of discrete nuclear fuel particles disposed within each fuel chamber means, each of said fuel particles being completely covered with a coating of impervious material which is capable of preventing passage therethrough of substantially all of the fission products produced in said nuclear fuel material throughout the expected life of the fuel element, the volume of said fuel chamber means in one body section being different from the volume of said fuel chamber means in an adjacent zone whereby different nuclear fuel loadings in adjacent fuel zones is facilitated.

6. A fuel element for a nuclear reactor utilizing a fluid coolant stream, which fuel element comprises a plurality of axially aligned elongated separate fuel element body sections in the form of sleeves having internal central bores which are axially aligned with one another, each of said elongated sleeves having formed therein longitudinally extending fuel chamber means, said fuel chamber means in one body section being separate from said fuel chamber means in an adjacent body section to provide a plurality of separate longitudinal fuel zones, a spine of structurally strong refractory material having neutron moderating characteristics comprising the primary longitudinal structural member of the fuel element axially disposed within said aligned central bores and slideable therein, said spine being of regular polygonal shape proportioned to provide longitudinally extending passageway means for the fluid coolant in the space between the outer surface of said spine and the inner surface of said bores, and nuclear fuel material disposed within each fuel chamber means, the volume of said fuel chamber means in one body section being different from the volume of said fuel chamber means in an adjacent zone whereby different nuclear fuel loadings in adjacent fuel zones is facilitated.

7. A fuel element for a nuclear reactor utilizing a fluid coolant stream, which fuel element comprises a plurality of axially aligned elongated separate, fuel element body sections in the form of interconnected sleeves having internal central bores which are axially aligned with one another, said interconnected sleeves forming the primary longitudinal structural member of the fuel element, each of said elongated sleeves having formed therein upwardly open longitudinally extending fuel chamber means, said fuel chamber means in one body section being separate from said fuel chamber means in an adjacent body section to provide a plurality of separate longitudinal fuel zones, a spine of neutron moderating material disposed within said aligned central bores, said spine being of regular polygonal cross section proportioned to provide longitudinally extending passageway means for the fluid coolant in the space between the outer surface of said spine and the inner surface of said bores, a bed of discrete nuclear fuel particles disposed within each fuel chamber means, each of said fuel particles being completely covered with a coating of impervious material which is capable of preventing passage therethrough of substantially all of the fission products produced in said nuclear fuel material throughout the expected life of the fuel element, and plug means closing the upper ends of said fuel chamber means, the volume of said fuel chamber means in one body section being different from the volume of said fuel chamber means in an adjacent zone whereby different nuclear fuel loadings in adjacent fuel zones is facilitated.

References Cited by the Examiner
UNITED STATES PATENTS

| | | | |
|---|---|---|---|
| 3,111,477 | 11/1963 | Bean | 176—69 |
| 3,135,665 | 6/1964 | Koutz et al. | 176—71 |
| 3,142,625 | 7/1964 | Wellborn | 176—90 |
| 3,145,149 | 8/1964 | Imhoff | 176—73 |
| 3,158,547 | 11/1964 | Smith | 176—91 |
| 3,212,989 | 10/1965 | Fitzer et al. | 176—91 |
| 3,224,944 | 12/1965 | Turner et al. | 176—71 |
| 3,247,008 | 4/1966 | Finicle | 176—91 |
| 3,274,068 | 9/1966 | Koutz et al. | 176—83 |
| 3,274,070 | 9/1966 | Vanslager | 176—83 |

L. DEWAYNE RUTLEDGE, *Primary Examiner.*